INVENTOR
MILTON P. LAURENT

BY

ATTORNEY

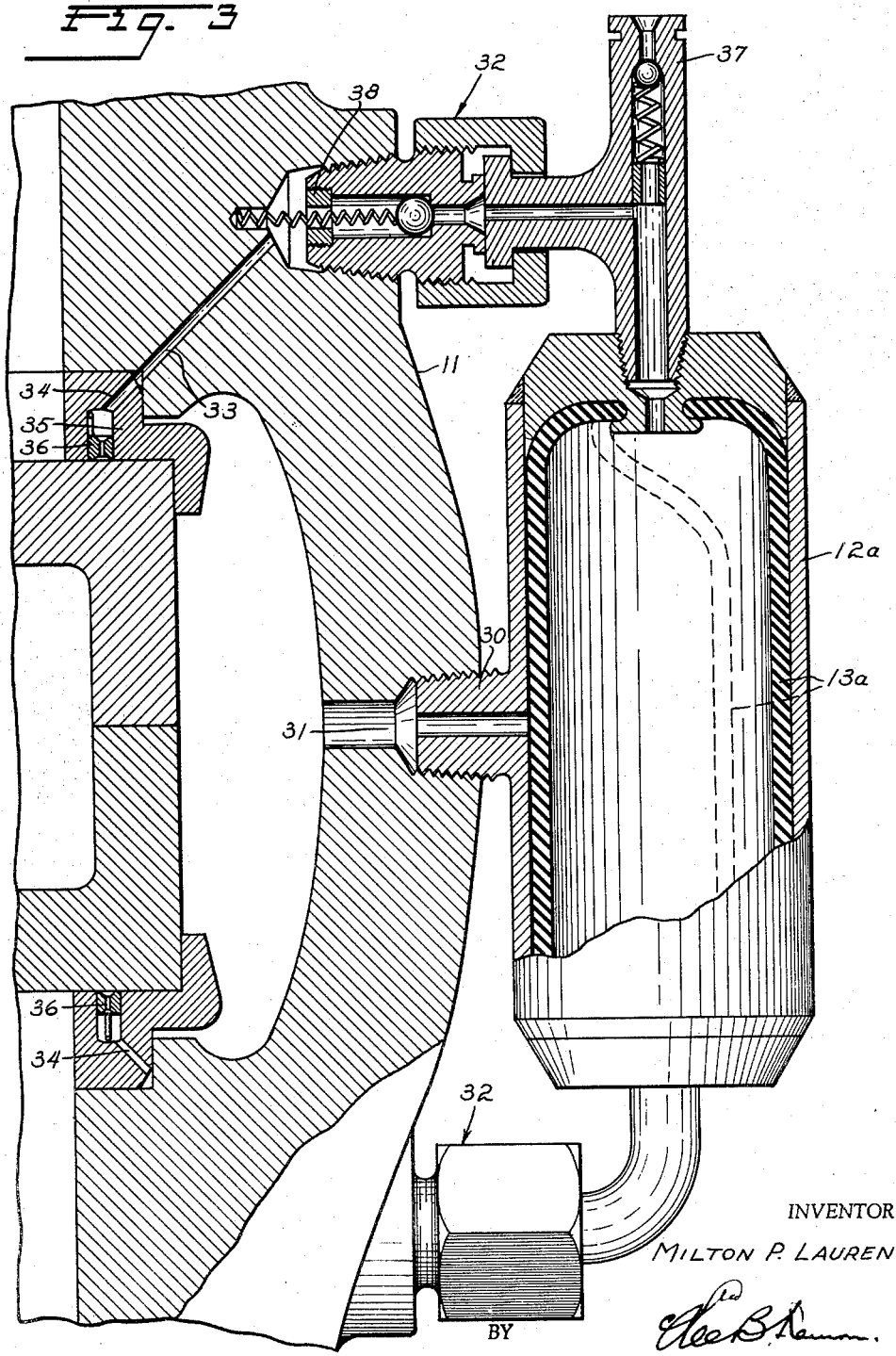

United States Patent Office 2,951,497
Patented Sept. 6, 1960

2,951,497
AUTOMATIC VALVE SEALING AND/OR LUBRICATING SYSTEM

Milton P. Laurent, Houston, Tex., assignor, by mesne assignments, to ACF Industries, Incorporated, a corporation of New Jersey Filed Oct. 22, 1953, Ser. No. 387,670

13 Claims. (Cl. 137—246.13)

This invention relates to valves, and more particularly to automatic lubrication and sealing systems for valves of the type in which the valve member is urged into sealing engagement with both the up and downstream seats, in both the open and closed positions of the valve. Valves having this characteristic may be of either the reciprocating gate or rotary plug type, and examples may be found in the following U.S. patents to Milton P. Laurent: No. Re. 20,101, 1936; 2,583,512, 1952; 2,612,340, 1952.

Since the seating pressure in these valves must, of necessity, be higher than the line pressure in order to effect a seal, it is obviously desirable to lubricate both the up and downstream seats, in order to minimize wear at these points. In order to do this, it is equally obvious that there must be pressure on the lubricant in excess of either the line or seat pressure.

Lubrication is not as much of a problem when the valve is placed in service in a line carrying oil or other lubricant fluids. Under such circumstances, however, the apparatus of this invention is admirably suited to force a sealing compound to the valve seats. The material used, therefore, can be a lubricant, a sealing compound, or a mixture of the two, depending upon the fluid in the line in which the valve is placed. For convenience in the following description, the material will be referred to as a lubricant, but it will be understood that this is not to be considered a limiting feature of the invention.

It is a primary object of this invention to provide a lubrication system which will accomplish the above purpose automatically.

It is a further object of this invention to provide an automatic lubrication system which is simple, inexpensive, and which may be installed on valves in which the invention was not incorporated at the time of their manufacture.

It is a still further object of this invention to provide a system for effecting a seal in valves of this type where the valve is used in a line carrying fluids of a lubricating nature.

Other objects will be apparent to those skilled in the art from the following description read in conjunction with the attached sheets of drawing in which:

Figure 3 illustrates a modification of the invention shown in Figure 1.

One solution provided by this invention for the lubrication problems, hereinbefore set out, makes use of the pressure changes which occur within the body of valves of this type. In order to understand these pressure changes, it must be kept constantly in mind that pressures within the valve body are effectively isolated from those in the line whenever the valve is in either the open or closed position. Valves of this type are very commonly used in the oil fields and also in the refineries. Almost without exception, such installations experience wide changes in ambient temperature. Consider, for example, a valve which is out in the open and therefore exposed to sunlight by day and then to cooler air at night. With the valve body isolated from the line, the pressure within the body may rise to a level many times that existing in the lines when there is only a small rise in ambient temperature. Actual measurements have demonstrated this rise in pressure may be of the order of 75 pounds per square inch per degree Fahrenheit rise in temperature. While there are pressure changes in the lines under these same conditions, they are small as compared to pressure changes within the relatively small space defined by the walls of the valve body. Accordingly, this rise in body pressure may be utilized in this invention as one way of forcing lubricant to both sealing faces of the valve.

Figure 1:
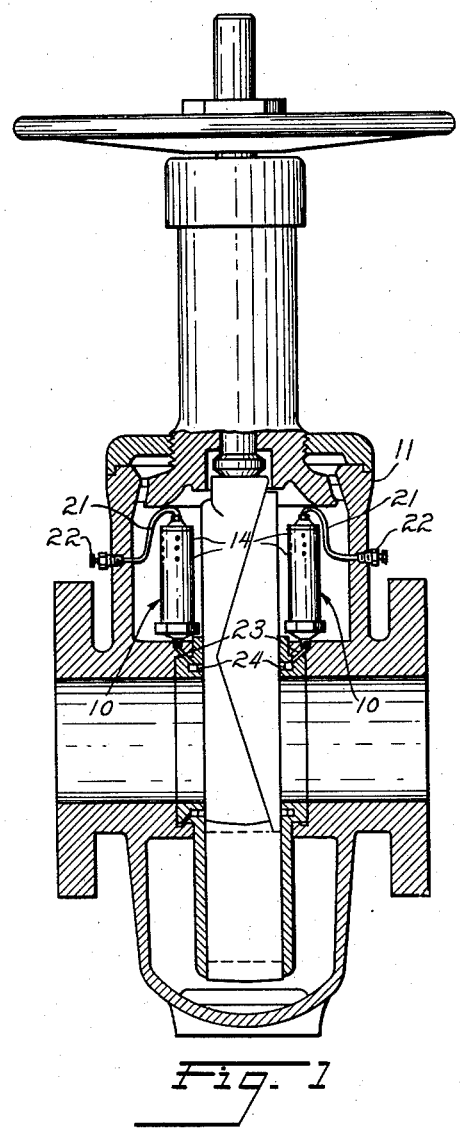
Figure 1 is a side elevation partially in section, showing one preferred embodiment of this invention.
Figure 2:
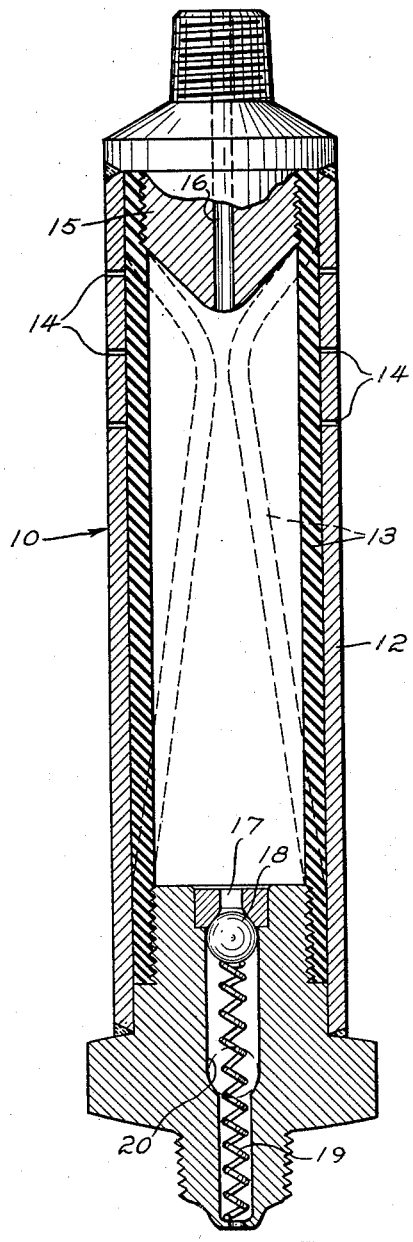
Figure 2 is a side elevation partially in section, of a lubricant reservoir for use in this system.

Referring first to Figures 1 and 2 of the attached drawings, which show one preferred embodiment of this invention, there is shown a pair of lubricant reservoirs 10 mounted entirely within the valve body 11. Figure 2 shows in detail the structure of the lubricant reservoir and metering device. It consists primarily of a rigid outer tubular member 12 and a flexible tubular inner member 13, the two being concentrically arranged. The outer tubular member includes a plurality of openings 14 in the side wall thereof and it is these openings which enable changes in pressure within the valve body to be transmitted to the lubricant itself, in order to force lubricant to the sealing surfaces of the valve. The inner tubular member may be made of rubber or other flexible or resilient material and forms the ultimate container for the lubricant. The outer member 12 must be rigid and preferably metallic, although there will be obvious material substitutes. At the upper end of the lubricant reservoir, as shown in Figure 2, there is provided a fitting 15 which surrounds an opening 16 leading into the interior of the reservoir. This serves as a filler opening, in order that the supply of lubricant in the reservoir may be replenished from time to time as necessary. At the opposite end of the reservoir there is a second opening 17 communicating with the interior of the reservoir. This latter opening is normally closed by a spring-pressed ball check valve 18, as shown. The check valve serves a double purpose, however, and in fact its particular function in this disclosure is that of a metering device. An increase in the pressure on the lubricant within the reservoir will unseat the ball 18 and cause it to travel against the force of the biasing spring 19 toward the opposite end of its chamber 20. Thus a metered amount of lubricant is extruded on each pressure differential fluctuation sufficient to overcome the force of the biasing spring 19. In this way, the entire lubricant supply in the reservoir is not exhausted on each pressure cycle, as only a relatively small amount of the total contents is delivered during each cycle.

A pair of the above described reservoirs is mounted entirely within the valve body in the embodiment shown in Figure 1. Conduits 21 are connected to the filler openings of the reservoirs at one end thereof and these conduits extend through the body of the valve to fittings 22 mounted exteriorly on the valve body. The latter fittings may conveniently be of the well known Alemite type. In order to replenish the lubricant supply, it will only be necessary to attach a pressure gun to the fitting without the necessity of removing the bonnet from the valve. The metered opening of the reservoir is connected to lubricant channels 23 which lead to the usual grooves 24 in the valve seats which house the wiper rings.

From the above description it will be apparent that a pressure rise within the valve body 11 will be communicated to the lubricant within the reservoir 10 by reason of the ported openings 14 in the outer member 12. Whenever, therefore, the body pressure rises to a value above line pressure, a metered amount of lubricant will be supplied to the sealing surfaces of the valve seats. Such a pressure rise occurs at least once daily due to ambient temperature changes.

This will produce automatic lubrication in all valves of the type in which the body pressure is isolated from the line pressure.

Obviously, a single reservoir could be used, instead of a pair, and in this case closed conduits would have to be provided linking the reservoir outlet and the valve seats.

In the case of a rising stem valve there is a further condition giving rise to pressure changes within the body, which condition can also be utilized to actuate the automatic lubricator of this invention. Due to the pressure packing around the stem of a rising stem valve, there is a certain amount of piston action which develops during movement of the valve from an open to a closed position. Following establishment of a seal on both the up and downstream seats, there is a further movement of the stem effective to completely expand the segments of the valve member and this further movement of the stem results in a rise in pressure within the valve body, which has been demonstrated to be sufficient to operate the automatic lubricator described herein.

A lubricating device substantially as described above and shown in Figures 1 and 2 may be mounted entirely outside the valve body with only minor modifications. This construction is shown in Figure 3. This figure is a horizontal section through a valve of the type shown in Figure 1. In this case the reservoir is substantially identical to that shown in Figures 1 and 2 with the exception that the side wall of the outer member 12a is imperforate rather than ported. The member 12a is, of course, ported to the valve chamber. In order to communicate valve body pressure to the lubricant, it is necessary to furnish a means of communication between the interior of the valve body and the space intermediate the inner and outer tubular members of the reservoir. Figure 3 shows a reservoir provided with a projecting hollow fitting 30 which may be threadedly joined to the valve body through an opening 31, to establish the necessary pressure connection. In this modification, the reservoir is provided with a pair of openings at opposite ends thereof, each of which communicates with a fitting 32 on the valve body. The fittings 32 each house a metering device substantially identical to the one shown and described with reference to Figure 2. Channels 33 in the valve body connect the inner ends of these fittings with the grooves 34 in the valve seats 35 housing the wiper rings 36 in order to provide a path for the flow of lubricant. As before, a filling fitting 37 is also provided in order to replenish the supply of lubricant in the reservoir.

It may be convenient and desirable to provide the metering device with an adjustable member in order to vary the length of the metering chamber to predetermine the quantity of lubricant to be delivered per stroke. Such a member is shown at 38 in Figure 3.

The description of the invention thus far has been limited to utilization of the isolated valve body pressure changes for actuating the lubricator proper. It will be apparent to those skilled in the art that other pressure sources could readily be used. The only conditions which must be met are that the pressure source must be a fluctuating one and the high side of the fluctuation must be at a pressure which is high enough to overcome line pressure on the valve seats.

Considering the embodiment illustrated in Figure 3, it will be apparent that if the pressure in the lubricant reservoir should rise above the pressure in the valve body, the flexible inner member 13a will effectively seal off the openings 31 and lubricant will be forced to both seats. Thermal pressure variations within an outside mounted lubricant reservoir will cause such a pressure relationship. This then presents a still further solution of the instant lubrication problem. In a given valve, both an inside and outside mounted lubricant reservoir could be used. In this way, lubrication would be assured by either pressure variation within the valve body acting on both the inner and outer reservoirs or failing that, by thermal expansion of lubricant in the outside mounted reservoir alone.

To carry the above even further, an outside mounted reservoir could be connected, not to the interior of the valve body as shown in Figure 3, but to an independent source of varying pressure. Examples of independent pressure sources adaptable to this use would include, for example, a sealed container, enclosing a volatile fluid, the container being subject to ambient temperature changes adjacent to or even at a remote point from the valve itself. When the valve to be lubricated is employed in an oil field or refinery, there will be innumerable sources of varying pressure which could be adapted readily to this use.

The lubrication system of this invention has been thus far described with particular reference to its application to reciprocating gate valves. It will be apparent to those skilled in the art, however, that it is equally applicable to rotary plug valves, so long as the plug valve is of the type which creates a seal on both the up and downstream valve seats in both the open and closed positions of the valve to effectively isolate pressures within the valve body from pressures in the lines in which the valve is installed. It is not believed necessary for the purposes of this disclosure to illustrate such an application, but reference may be had to U.S. Patent No. 2,612,340, mentioned hereinbefore, for a disclosure of a plug valve to which the lubrication system of this invention is applicable.

From the foregoing it will be apparent that there is herein shown and described a novel lubrication system useful in specific types of valves which find wide application throughout the petroleum and other industries. Variations are contemplated within the scope of the appended claims.

I claim:

1. In combination with a valve for controlling fluid flow in a line, wherein the valve is of the type in which the valve body is sealed off from the line in both open and closed positions of the valve, a system for feeding liquid to the sealing surfaces of the valve seats comprising: a liquid reservoir; means including a liquid metering device connecting the interior of said reservoir to the sealing faces of the valve seats; a source of pressure dependent upon fluctuations of ambient temperature fluctuating between values above and below pressures in the line in which the valve is installed; and means for subjecting the liquid in said reservoir to said source of fluctuating pressure.

2. The combination defined by claim 1 in which the liquid reservoir comprises a rigid hollow outer receptacle and a flexible inner receptacle positioned therewithin said inner receptacle forming the actual liquid container and substantially filling the outer receptacle when fully charged with liquid.

3. In combination: a rising stem gate valve for controlling fluid flow in a line including a body, a valve member, up and downstream seats, and means for effecting a pressure seal between said member and said seats in both open and closed positions of the valve; a lubricant reservoir; means including a lubricant metering device connecting said reservoir to the sealing faces of said seats; and means for subjecting the lubricant in said reservoir to fluid pressure fluctuation within the valve body caused by piston action on opening and closing valve movements and fluctuations of ambient temperature.

4. The combination defined in claim 3 in which the metering device comprises a spring biased check valve normally closing the path between said reservoir and the valve seats.

5. The combination defined in claim 3 in which the metering device comprises an adjustable-stroke-spring-biased ball check valve normally closing the path between said reservoir and the valve seats which upon each pressure differential fluctuation in the reservoir sufficient to overcome the pressure on the spring will deliver a metered amount of lubricant.

6. A lubrication system as defined by claim 3 in which the lubricant reservoir comprises a rigid hollow ported receptacle, a flexible container positioned therewithin substantially filling said receptacle when fully charged with lubricant, and means permitting the admission and discharge of lubricant from said reservoir.

7. In combination with a rising stem valve of the type in which body pressure is isolated from line pressure in both open and closed positions of the valve, an automatic lubrication system comprising: a lubricant reservoir mounted interiorly of the valve body; means including a lubricant metering device connecting said reservoir to the sealing faces of the valve seats; and means for subjecting the lubricant in said reservoir to fluid pressure fluctuation within said valve body resulting from piston action of the stem on opening and closing the valve and fluctuations of ambient temperature.

8. A system as defined by claim 7 in which the lubricant reservoir comprises a rigid ported-wall hollow receptacle, a flexible container positioned within said receptacle, and means permitting the admission and discharge of lubricant therefrom.

9. A system as defined by claim 7 in which the metering device comprises a spring-biased ball type check valve normally closing the path between said reservoir and the valve seats.

10. In combination with a rising stem valve for controlling fluid flow in a line wherein the valve is of the type in which the body pressure is isolated from the line pressure in both open and closed positions of the valve, an automatic lubrication system comprising: a lubricant reservoir including a rigid hollow receptacle, a hollow flexible container positioned within said receptacle, and means connected to said container for permitting the admission and discharge of lubricant therefrom, said reservoir being positioned on and exteriorly of the valve body; means including a metering device connecting the interior of said container to the sealing faces of the valve; and means for subjecting the lubricant in said container to fluid pressure fluctuations within the valve body resulting from piston action of the stem on opening and closing the valve and fluctuations of ambient temperature.

11. A system as defined by claim 10 in which the metering device comprises a spring-biased ball type check valve normally closing the path between said reservoir and the valve seats.

12. An automatic lubrication system for a rising stem valve comprising in combination: a valve of the type in which the body is isolated from the line pressure in both open and closed positions of the valve, a lubricant reservoir including a rigid ported-wall hollow receptacle and a flexible lubricant container therein attached to the exterior of the valve; conduit means connecting said reservoir to the sealing surfaces of the seats of said valve; metering means comprising a spring-pressed ball type check valve connected in said conduit means, the ball being normally biased against a seat the open side of which communicates with the interior of said lubricant container; further conduit means connecting the interior of the valve body with a port in the wall of said receptacle, to subject the flexible lubricant container to pressures within the valve body greater than the pressure at the sealing surfaces of the seats, said pressures resulting from piston action of the stem on opening and closing the valve and fluctuations of ambient temperature; and means connected to said reservoir for replenishing the lubricant supply therein.

13. An automatic lubrication system for a rising stem valve comprising in combination: a valve of the type in which the body is isolated from the line pressure in both open and closed positions of the valve, a lubricant reservoir including a rigid ported-wall receptacle and a flexible lubricant container therein, said reservoir being mounted wholly within the valve body; conduit means connecting the sealing surfaces of the valve seats with the interior of the said flexible container; metering means comprising a spring-pressed ball type check valve connected in said conduit means, the ball being normally biased against a seat the open side of which communicates with the interior of said lubricant container; and further means including a conduit communicating with the interior of said lubricant container and the exterior of the valve body serving as filler means for the lubricant reservoir, said reservoir being subject to fluid pressure fluctuations within the valve body resulting from the piston action of the stem on opening and closing the valve and fluctuations of ambient temperature.

References Cited in the file of this patent

UNITED STATES PATENTS

| | | |
|---|---|---|
| 1,571,150 | Trinks | Jan. 26, 1926 |
| 1,980,768 | Specht | Nov. 13, 1934 |
| 2,055,449 | Beckwith | Sept. 22, 1936 |
| 2,068,810 | McCausland | Jan. 26, 1937 |
| 2,105,490 | Noble | Jan. 18, 1938 |
| 2,161,175 | Laurent | June 6, 1939 |
| 2,235,897 | Moore | Mar. 25, 1941 |
| 2,276,939 | Davis | Mar. 17, 1942 |
| 2,299,517 | Volpin | Oct. 20, 1942 |
| 2,300,835 | Volpin | Nov. 3, 1942 |
| 2,332,282 | Volpin | Oct. 19, 1943 |
| 2,360,599 | Volpin | Oct. 17, 1944 |
| 2,605,078 | Volpin | July 29, 1952 |
| 2,649,110 | Bergquist | Aug. 18, 1953 |
| 2,726,842 | Seamark | Dec. 13, 1955 |

FOREIGN PATENTS

| | | |
|---|---|---|
| 187,519 | Great Britain | Oct. 22, 1922 |
| 445,636 | Great Britain | Apr. 16, 1936 |